(12) United States Patent
Chaudhuri et al.

(10) Patent No.: US 6,363,371 B1
(45) Date of Patent: Mar. 26, 2002

(54) IDENTIFYING ESSENTIAL STATISTICS FOR QUERY OPTIMIZATION FOR DATABASES

(75) Inventors: Surajit Chaudhuri; Vivek Narasayya, both of Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/342,988

(22) Filed: Jun. 29, 1999

(51) Int. Cl.[7] .............................................. G06F 17/30

(52) U.S. Cl. .......................................................... 707/2

(58) Field of Search ..................... 707/2, 3–7

(56) References Cited

U.S. PATENT DOCUMENTS

| | | | | |
|---|---|---|---|---|
| 5,761,653 A | * | 6/1998 | Schiefer et al. | 707/2 |
| 5,875,445 A | * | 2/1999 | Antonshenkov | 707/2 |
| 6,108,647 A | * | 8/2000 | Poosala et al. | 707/1 |

OTHER PUBLICATIONS

Choenni S., Blanken H., Chang T., "Index Selection in Relational Databases", Proc. 5th IEEE ICCI 1993.
Chaudhuri S., Narasayya V., "An Efficient, Cost–Driven Index Selection Tool for Microsoft SQL Server 7.0", Microsoft Research Technical report, in preparation, 1998.
Chaundhuri, S., Motwani R., Narasayya V., "Random Sampling For Histogram Construction: How much is enough?" Proceedings of the ACM SIGMOD International Conference on Management of Data, 1988.
Chaundhuri, S., Marasayya V., "An Efficient. Cost–Driven Index Selection Tool for Microsoft SQL Server." Proceedings of the 23rd VLDB Conference Athens, Greece, 1997.
Frank M., Omiecinski E., Navathe S., "Adaptive and Automated Index Selection in RDBMS", EDBT 92.
Finkelstein S., Schkolnick M., Tiberio P., "Physical Database Design for Relational Databases", ACM TODS, Mar. 1988.
Gibbons P.B., Matias Y., Poosala V., "Fast Incremental Maintenance of Approximate Histograms." Proceedings of the 23rd VLDB Conference, Athens, Greece, 1997, pp. 466–475.
Haas P.J., Naughton J.F., Seshadri S., Stokes L., "Sampling-Based Estimation of the No. of Distinct Values of an Attribute." Proceedings of the 21st VLDB Conference, pp. 311–322, 1995.

(List continued on next page.)

*Primary Examiner*—Diane D. Mizrahi
(74) *Attorney, Agent, or Firm*—Watts, Hoffmann, Fisher & Heinke, Co., L.P.A.

(57) ABSTRACT

An essential statistics identification utility tool attempts to reduce or minimize the overhead associated with statistics by identifying from an initial set of statistics a set of essential statistics that provide a query optimizer with the ability to choose among query execution plans with minimized loss in accuracy as compared to using the initial set of statistics. The set of essential statistics is identified as a subset of the initial set of statistics that is equivalent to the initial set of statistics with respect to each query of a workload. The subset of statistics is equivalent to the initial set of statistics if an execution plan for each query using the subset of statistics is the same as an execution plan for that query using the initial set of statistics and/or if a cost estimate to execute each query against the database using the subset of statistics is within a predetermined amount of a cost estimate to execute that query against the database using the initial set of statistics. The subset of statistics may be identified such that any proper subset of the subset of statistics is not equivalent to the initial set of statistics with respect to each query. The subset of statistics may also be identified such that an update cost or size for the subset of statistics is minimized.

63 Claims, 6 Drawing Sheets

OTHER PUBLICATIONS

Ioannidis Y., Poosala V., "Balancing Histogram Optimality and Practicality for Query Result Size Estimation." Proceedings of the ACM SIGMOD International Conference on Management of Data, pp. 233–245, 1995.

Poosala V., Ioannidis Y., Haas P., Shekita E., "Improved Histograms for Selectivity Estimation of Range Predicates." Proceedings of the ACM SIGMOD International Conference on Management of Data, pp. 294–305, 1996.

Slutz, D., Massive Stochastic Testing of SQL, Proceedings of VLDB, 1998.

Poosala V., Ioannidis Y., "Selectivity Estimation Without the Attribute Value Independence Assumption", Proceedings of the 23rd VLDB Conference, Athens, Greece, 1997, pp. 486–495.

Labio, W.J., Quass D., Adelberg B., "Physical Database Design for Data Warehouses", Proc. of ICDE97.

* cited by examiner

US 6,363,371 B1

IDENTIFYING ESSENTIAL STATISTICS FOR QUERY OPTIMIZATION FOR DATABASES

TECHNICAL FIELD

The present invention relates generally to the field of database systems. More particularly, the present invention relates to the field of query optimization for database systems.

BACKGROUND OF THE INVENTION

Computer database systems manage the storage and retrieval of data in a database. A database comprises a set of tables of data along with information about relations between the tables. Tables represent relations over the data. Each table comprises a set of records of data stored in one or more data fields. The records of a table are also referred to as rows, and the data fields of records in a table are also referred to as columns.

A database server processes data manipulation statements or queries, for example, to retrieve, insert, delete, and update data in a database. Queries are defined by a query language supported by the database system. To enhance performance in processing queries, database servers use indexes to help access data in a database more efficiently. Typical database servers comprise a query optimizer to generate efficient execution plans for queries with respect to a set of indexes. Query optimizers typically rely on statistics to derive cost estimates and choose among possible execution plans for a query. The availability of statistics can greatly improve cost estimation and the quality of execution plans chosen by the query optimizer.

Statistics may be created and maintained on a table, an index, a single column of a table, or combinations of columns of a table, although the structure of statistics may vary from system to system. Single column statistics typically comprise a histogram of values in the domain of that column and may include one or more of the following parameters: the number of distinct values in the column, the density of values in the column, and the second highest and the second lowest values in the column. Multi-column statistics typically represent information on the distribution of values over the Cartesian product of the domains in it. As one example, multi-column statistics on ($R_2$.c, $R_2$.d) may contain information on the joint distribution of values over $R_2$.c and $R_2$.d. In Microsoft® SQL Server, for example, such multi-column statistics would contain joint density information and a histogram on the leading dimension $R_2$.c. The single and multi-column statistics available for a database make cost estimation significantly more accurate and help the query optimizer arrive at better query execution plans. In the absence of statistics, cost estimates can be dramatically different often resulting in a poor choice of the execution plan.

Creating as well as maintaining statistics, however, can incur significant costs in storage, time, and memory, particularly for large databases. The space of single and multi-column statistics can be very large because many combinations of columns are possible. Statistics can therefore consume significant amounts of secondary storage. Also, to remain effective, statistics need to be updated as the data in the database changes. The cost of updating statistics on columns of large tables can be substantial. Updating statistics on a column requires scanning the table for values in that column and sorting the values to produce, for example, a histogram and other statistics. Furthermore, the query optimizer loads all potentially relevant statistics for a query into memory during optimization. Multiple users concurrently running against a database server, for example, can incur significant costs in CPU time and memory for loading statistics.

SUMMARY OF THE INVENTION

An essential statistics identification utility tool attempts to reduce or minimize the overhead associated with statistics by identifying from an initial set of statistics a set of essential statistics that provide a query optimizer with the ability to choose among query execution plans with minimized loss in accuracy as compared to using the initial set of statistics.

A method identifies statistics for use in executing one or more queries against a database. The method may be implemented by computer-executable instructions of a computer readable medium. A database system may perform the method with suitable means.

For the method, an initial set of statistics is identified. A subset of the initial set of statistics equivalent to the initial set of statistics with respect to each query is then identified. The subset of statistics is equivalent to the initial set of statistics if an execution plan for each query using the subset of statistics is the same as an execution plan for that query using the initial set of statistics and/or if a cost estimate to execute each query against the database using the subset of statistics is within a predetermined amount of a cost estimate to execute that query against the database using the initial set of statistics. The predetermined amount may be a predetermined percentage of the cost estimate to execute that query against the database using the initial set of statistics. Also, the predetermined amount may be zero.

The subset of statistics may be identified such that any proper subset of the subset of statistics is not equivalent to the initial set of statistics with respect to each query and/or such that an update cost or size for the subset of statistics is minimized.

The subset of statistics may be identified by removing statistics from the initial set of statistics if the remaining subset of statistics is equivalent to the initial set of statistics with respect to each query.

The one or more queries may be identified from a workload of queries as the one or more queries that have estimated execution costs greater than any other query of the workload and that account for at least a predetermined percentage of a total estimated execution cost for the workload. Each query of the workload may be identified such that the subset of statistics is not equivalent to the initial set of statistics with respect to that query, and another subset of statistics may be identified by removing statistics from the initial set of statistics if the remaining subset of statistics is equivalent to the initial set of statistics with respect to each such identified query.

For each statistic of the initial set of statistics, a respective set of queries may be identified from a workload of queries such that that statistic is potentially relevant to each query in the respective query set and such that each query in the respective query set has estimated execution costs greater than any other potentially relevant query of the workload. For each statistic of the initial set of statistics, whether the initial set of statistics without that statistic is equivalent to the initial set of statistics with respect to each query in the respective query set may then be determined, and, if not, that statistic is included in a first subset of statistics. The one or more queries may then be identified from the workload as each query of the workload such that the first subset of statistics is not equivalent to the initial set of statistics with respect to that query.

The subset of statistics may be identified by identifying a subset of the initial set of statistics, determining whether such an identified subset of statistics is equivalent to the initial set of statistics with respect to each query, and repeating these steps for other subsets of the initial set of statistics. These steps may be repeated until an identified subset of statistics is equivalent to the initial set of statistics with respect to each query. Subsets of the initial set of statistics may be identified in increasing order of update cost or size.

The subset of statistics may be identified by identifying a seed subset of the initial set of statistics, adding a subset of the remaining subset of the initial set of statistics to the seed subset to produce a current subset of statistics, determining whether the current subset of statistics is equivalent to the initial set of statistics with respect to each query, and repeating these steps for other subsets of the remaining subset of the initial set of statistics. These steps may be repeated until the current subset of statistics is equivalent to the initial set of statistics with respect to each query. The seed subset may be identified by determining whether the initial set of statistics without any one statistic of the initial set of statistics is equivalent to the initial set of statistics with respect to each query, and, if not, including the one statistic in the seed subset. Subsets of the remaining subset of the initial set of statistics may be identified in increasing order of update cost or size.

The subset of statistics may be identified by partitioning statistics of the initial set of statistics into partitions such that each partition comprises statistics on a respective table of one of the one or more queries, identifying a subset of each partition such that the combined partition subsets are equivalent to the initial set of statistics with respect to the one query, and repeating these steps for each query. Each partition subset may be identified such that an update cost or size for each partition subset is minimized.

The subset of statistics may be identified by identifying a seed subset of the initial set of statistics, partitioning statistics of the remaining subset of the initial set of statistics into partitions such that each partition comprises statistics on a respective table of one of the one or more queries, identifying a subset of each partition such that the combined partition subsets and seed subset are equivalent to the initial set of statistics with respect to the one query, and repeating these steps for each query. The seed subset may be identified by determining whether the initial set of statistics without any one statistic of the initial set of statistics is equivalent to the initial set of statistics with respect to each query, and, if not, including the one statistic in the seed subset. Each partition subset may be identified such that an update cost or size for each partition subset is minimized.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

An essential statistics identification utility tool attempts to reduce or minimize the overhead associated with statistics by identifying from an initial set of statistics a set of essential statistics that provide a query optimizer with the ability to choose among query execution plans with minimized loss in accuracy as compared to using the initial set of statistics.

EXEMPLARY OPERATING ENVIRONMENT

Figure 1:
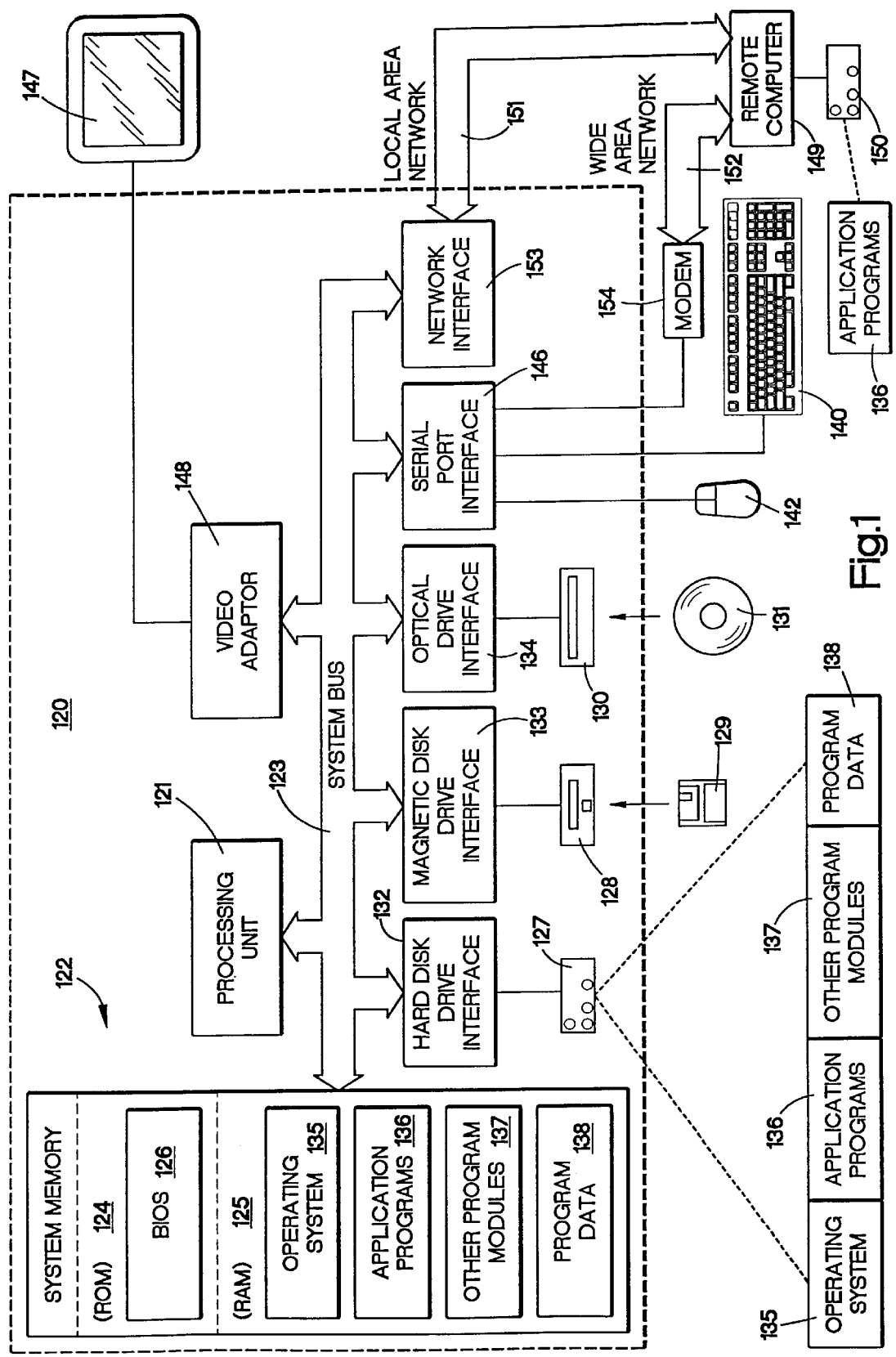
FIG. 1 illustrates an exemplary operating environment for identifying an initial set of statistics and for identifying an essential set of statistics from the identified initial set for query optimization.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 120, including a processing unit 121, a system memory 122, and a system bus 123 that couples various system components including system memory 122 to processing unit 121. System bus 123 may be any of several types of bus structures including a memory bus or memory controller, a peripheral bus, and a local bus using any of a variety of bus architectures. System memory 122 includes read only memory (ROM) 124 and random access memory (RAM) 125. A basic input/output system (BIOS) 126, containing the basic routines that help to transfer information between elements within personal computer 120, such as during start-up, is stored in ROM 124. Personal computer 120 further includes a hard disk drive 127 for reading from and writing to a hard disk, a magnetic disk drive 128 for reading from or writing to a removable magnetic disk 129, and an optical disk drive 130 for reading from or writing to a removable optical disk 131 such as a CD ROM or other optical media. Hard disk drive 127, magnetic disk drive 128, and optical disk drive 130 are connected to system bus 123 by a hard disk drive interface 132, a magnetic disk drive interface 133, and an optical drive interface 134, respectively. The drives and their associated computer-readable media provide nonvolatile storage of computer-readable instructions, data structures, program modules and other data for personal computer 120. Although the exemplary environment described herein employs a hard disk, a removable magnetic disk 129 and a removable optical disk 131, it should be appreciated by those skilled in the art that other types of computer-readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into personal computer 120 through input devices such as a keyboard 140 and pointing device 142. Other input devices may include a microphone, joystick, game pad, satellite dish, scanner, or the like. These and other input devices are often connected to processing unit 121 through a serial port interface 146 that is coupled to system bus 123, but may be connected by other interfaces, such as a parallel port, game port or a universal serial bus (USB). A monitor 147 or other type of display device is also connected to system bus 123 via an interface, such as a video adapter 148. In addition to the monitor, personal computers typically include other peripheral output devices, such as speakers and printers.

Personal computer 120 may operate in a networked environment using logical connections to one or more remote computers, such as a remote computer 149. Remote computer 149 may be another personal computer, a server, a router, a network PC, a peer device or other common network node, and typically includes many or all of the elements described above relative to personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, personal computer 120 is connected to local network 151 through a network interface or adapter 153. When used in a WAN networking environment, personal computer 120 typically includes a modem 154 or other means for establishing communications over wide area network 152, such as the Internet. Modem 154, which may be internal or external, is connected to system bus 123 via serial port interface 146. In a networked environment, program modules depicted relative to personal computer 120, or portions thereof, may be stored in remote memory storage device 150. It will be appreciated that the network connections shown are exemplary and other means of establishing a communications link between the computers may be used.

DATABASE SYSTEM

Figure 2:
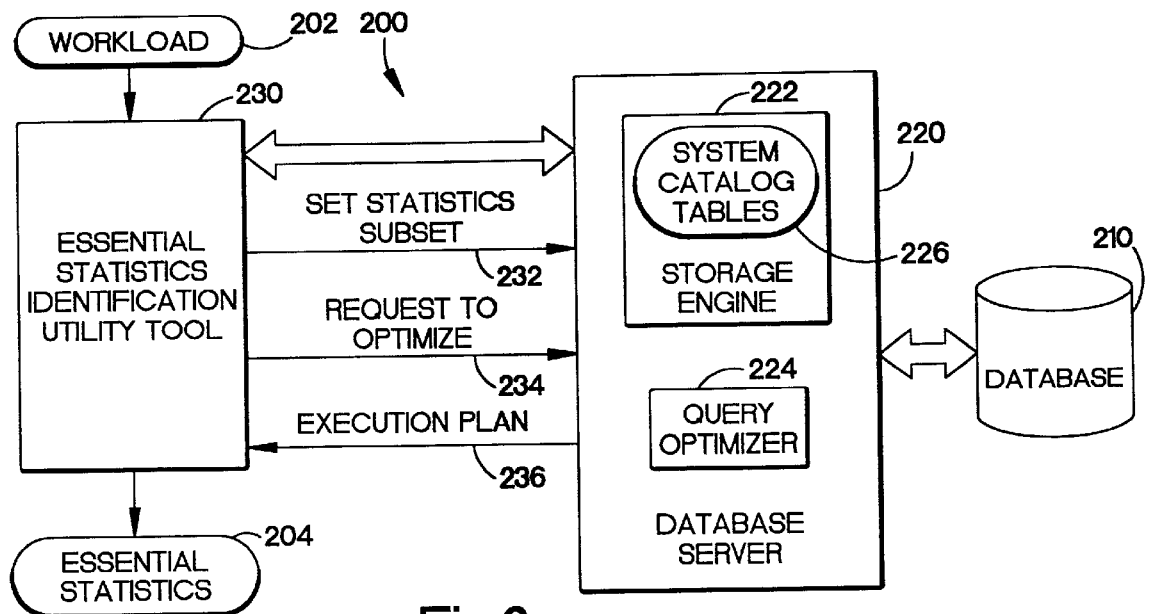
FIG. 2 illustrates an exemplary database system for identifying an initial set of statistics and for identifying an essential set of statistics from the identified initial set for query optimization.

FIG. 2 illustrates one example of a computer database system 200 for generating an initial set of statistics and for identifying essential statistics for query optimization. Database system 200 comprises a database 210, a database server 220, and an essential statistics identification utility tool 230. Database system 200 manages the storage and retrieval of data in database 210 in accordance with data manipulation statements or queries presented to database system 200 by a database application or by a user, for example.

Database 210 comprises a set of tables of data along with information about relations between the tables. Tables represent relations over the data. Each table comprises a set of records of data stored in one or more data fields. The records of a table are also referred to as rows, and the data fields of records in a table are also referred to as columns.

Database server 220 processes queries, for example, to retrieve, insert, delete, and/or update data in database 210. Database system 200 may support any suitable query language, such as Structured Query Language (SQL) for example, to define the queries that may be processed by database server 220. Suitable SQL queries include, for example, Select, Insert, Delete, and Update statements. Database server 220 for one embodiment comprises the Microsoft® SQL Server.

Database server 220 comprises a storage engine 222 for accessing data in database 210. To enhance performance in processing queries, database server 220 uses indexes to help access data in database 210 more efficiently. An index may be single-column or multi-column and may be clustered or non-clustered. Database server 220 comprises a query optimizer 224 to generate efficient execution plans for queries with respect to a set of indexes. In generating execution plans, query optimizer 224 relies on statistics on column(s) of table(s) referenced in a query to estimate, for example, the cost in time to execute the query against database 210 using more than one possible execution plan for the query. Query optimizer 224 may then choose among possible execution plans for the query. The notations Plan(Q,S) and Cost(Q,S) respectively represent the plan chosen by query optimizer 224 for a query Q and the execution cost of query Q estimated by query optimizer 224 using an available set of statistics S.

Query optimizer 224 may use any suitable statistics of any suitable structure for query optimization. A statistic is a summary structure associated with a set of one or more columns in a relation. One commonly used statistical descriptor is a histogram. Database server 220 may store statistics in system catalog tables 226, for example.

A set of statistics S can be denoted by a set comprising single-columns and/or multicolumns. Thus, the set $\{R_1.a, R_1.c, (R_2.c, R_2.d)\}$ represents a set of three statistics comprising single-column statistics on $R_1.a$, that is on column a of relation $R_1$; and $R_1.c$ and also comprising multi-column statistics on the two-column combination $(R_2.c, R_2.d)$. The notation $(R_2.c, R_2.d)$ denotes a two-dimensional statistic on columns c and d of relation $R_2$. The number of statistics in the set S is denoted by $|S|$.

Suitable single-column statistics comprise a histogram of values in the domain of that column and may include one or more of the following parameters: the number of distinct values in the column, the density of values in the column, and the second highest and the second lowest values in the column. Suitable multi-column statistics represent information on the distribution of values over the Cartesian product of the domains in it. As one example, multi-column statistics on ($R_2$.c, $R_2$.d) may contain information on the joint distribution of values over $R_2$.c and $R_2$.d. Where database server 220 comprises the Microsoft® SQL Server, such multi-column statistics contain joint density information and a histogram on the leading dimension $R_2$.c. As another example, such multi-column statistics may contain a histogram structure such as Phased or MHIST-p.

Although the availability of statistics can greatly improve cost estimation and the quality of execution plans chosen by query optimizer 224, creating as well as maintaining statistics can incur significant costs in storage, time, and memory, particularly where database 210 is large. The space of single-column and multi-column statistics can be very large since many combinations of columns are possible. Statistics can therefore consume significant amounts of secondary storage. Also, to remain effective, statistics need to be updated as the data in database 210 changes. The cost of updating statistics on columns of large tables can be substantial. Updating statistics on a column requires scanning the table for values in that column and sorting the values to produce, for example, a histogram and other statistics. Furthermore, query optimizer 224 loads all potentially relevant statistics for a query into memory during optimization. Multiple users concurrently running against database server 220, for example, can incur significant costs in CPU time and memory for loading statistics.

Essential statistics identification utility tool 230 attempts to reduce or minimize the overhead associated with statistics by identifying from an initial set of statistics a set of essential statistics 204 that provide query optimizer 224 with the ability to choose among execution plans with minimized loss in accuracy as compared to using the initial set of statistics. Essential statistics identification utility tool 230 identifies essential statistics 204 from the initial set of statistics based on a workload 202 of one or more queries.

Workload 202 may be any suitable set of one or more queries. Workload 202 may be, for example, a representative set of one or more queries to be executed against database 210. Workload 202 may be an organization specific representative workload used by a database administrator or a set of one or more queries identified by logging events at database server 220. Where database server 220 comprises the Microsoft® SQL Server, for example, the database administrator can use the SQL Server Profiler to log all queries that executed on database server 220 over the past week, for example. In addition, filters can be applied on a number of properties of the events in the log to select queries in accordance with a predetermined criteria. Queries that take at least one second to execute, for example, may be logged.

By exploiting the knowledge of the queries that database system 200 is to service, essential statistics identification utility tool 230 helps database system 200 to avoid constructing and maintaining statistics that are rarely or never referenced in executing queries on database system 200 and to construct and maintain statistics that are crucial for some queries and thereby avoid poor choices in execution plans.

Database server 220, storage engine 222, query optimizer 224, and essential statistics identification utility tool 230 are implemented for one example as program modules or computer-executable instructions and may be stored on any suitable computer-readable medium for execution in a suitable operating environment, such as the computing environment of FIG. 1 for example. The data of database 210 and system catalog tables 226 may be implemented in the form of one or more suitable data structures and may also be stored on any suitable computer-readable medium.

ESSENTIAL STATISTICS

Essential statistics identification utility tool 230 attempts to identify an essential set of statistics 204 characterized by two properties: admissible degree of error and minimality.

The property of an admissible degree of error may be defined in terms of equivalence, such as plan equivalence and/or optimizer-cost equivalence for example. A set of statistics $S_1$ is plan equivalent to a set of statistics $S_2$ with respect to a query Q if and only if Plan(Q,$S_1$)=Plan(Q,$S_2$). A set of statistics $S_1$ is optimizer-cost equivalent to a set of statistics $S_2$ with respect to a query Q if and only if $S_1$ has a relative cost difference less than a predetermined amount or k percent with respect to $S_2$ and Q, that is if and only if Cost-Diff(Q,$S_1$,$S_2$)=ABS(Cost(Q,$S_1$)−Cost(Q,$S_2$))/Cost(Q,$S_2$)$\leq$k %. Noting that both plan and optimizer-cost equivalence may be used and that k may be zero, a set of statistics $S_1$ is strongly equivalent to a set of statistics $S_2$ with respect to a query Q if and only if (1) Plan(Q,$S_1$)=Plan(Q,$S_2$) and (2) Cost(Q,$S_1$)=Cost(Q,$S_2$). As used herein, the terms equivalent and equivalence encompasses not only plan equivalence and/or optimizer-cost equivalence.

The property of minimality is orthogonal to the admissible degree of error. Minimality imposes an optimization criterion for choosing among all subsets of the initial set of statistics that are equivalent to help reduce the overhead associated with the creation and maintenance of statistics. Exemplary minimal essential sets include simple essential sets, memory-minimal essential sets, and update-cost-minimal essential sets.

A simple essential set of statistics with respect to a given initial set of statistics S and a given query Q is a subset $S_1$ of S such that $S_1$ but no proper subset of $S_1$ is equivalent to S with respect to Q. No statistics may be removed from an essential set of statistics without violating the applicable test of equivalence.

As one example where a query Q is SELECT*FROM $T_1$, $T_2$ WHERE $T_1$.a=$T_2$.b AND $T_1$.c<100, an initial set of statistics S={$T_1$.a, $T_2$.b, $T_1$.c}, and a subset of statistics $S_1$={$T_1$.a, $T_2$.b}, $S_1$ is an essential set of statistics satisfying the strongly equivalent property if all of the following conditions are true:

(1) Plan(Q,$S_1$)=Plan(Q,S) and Cost(Q,$S_1$)=Cost(Q,S);

(2) Plan(Q,{$T_1$.a})!=Plan(Q,S) or Cost(Q,{$T_1$.a})!=Cost(Q,S);

(3) Plan(Q,{$T_2$.b})!=Plan(Q,S) or Cost(Q,{$T_2$.b})!=Cost(Q,S); and (4) Plan(Q,{})!=Plan(Q,S) or Cost(Q,{})!=Cost(Q,S).

A given initial set of statistics S may have multiple essential sets of statistics with respect to the same query Q. Query optimizer 224 may then choose among the essential sets by comparing, for example, the number of statistics in each essential set or the total update cost of each essential set.

A memory-minimal essential set of statistics with respect to a given initial set of statistics S and a query Q is the simple essential set of statistics with respect to the initial set of statistics S and the query Q having the least number of statistics. Because single-column and multi-column statistics each typically occupy about the same amount of memory, minimizing the cardinality of the chosen essential set helps minimize the total amount of memory that may be needed during optimization of the query Q, particularly considering all the chosen statistics may need to be loaded.

An update-cost-minimal essential set of statistics with respect to a given initial set of statistics S and a query Q is a subset $S_1$ of S such that among all subsets of S that are equivalent to S with respect to Q, the sum of update cost parameters of the statistics of $S_1$ is the least. Any suitable update cost parameter may be used for each statistic $s_i$ of S. Suitable update cost parameters may depend on, for example, the nature of the statistic, whether single-column or multi-column; the size of the relation on which the statistic is defined; and/or the frequency of updates on column values. An update cost parameter $w_i$ that reflects an aggregate value of such costs may be associated with each statistic $s_i$. As one example where database server 220 comprises the Microsoft® SQL Server, the time to update an already created statistic $s_i$ is logged by database server 220 and may be used as cost parameter $w_i$.

Given a workload W 202 of one or more queries Q, an essential set of statistics with respect to a given initial set of statistics S and workload W 202 is a subset $S_1$ of S that is equivalent to S with respect to every query Q of workload W 202. The notion of equivalence with respect to workload W 202 may also be relaxed by only requiring equivalence with respect to at least a predetermined fraction of queries Q in workload W 202.

MONOTONICITY ASSUMPTION AND CRITICAL STATISTICS

As additional statistical information helps query optimizer 224 improves its cost estimations, the following monotonicity assumption is made. Given an initial set of statistics S and a query Q, if a subset $S_1$ of S is not equivalent to S with respect to query Q, then none of the subsets of $S_1$ are equivalent to S with respect to query Q.

As a consequence of the monotonicity assumption, if a given statistic $s_i$ is removed from a given set of statistics S and the remaining subset of statistics S-$\{s_i\}$ is not equivalent to S, the statistic $s_i$ is critical to S.

As one example where a query Q is SELECT*FROM $T_1$, $T_2$ WHERE $T_1.a=T_2.b$ AND $T_1.c<100$, an initial set of statistics S=$\{T_1.a, T_2.b, T_1.c\}$, and (1) Plan(Q,S-$\{T_1.a\}$)!=Plan(Q,S),
(2) Plan(Q,S-$\{T_2.b\}$)!=Plan(Q,S), and
(3) Plan(Q,S-$\{T_1.c\}$)=Plan(Q,S) and Cost(Q,S-$\{T_1.c\}$)= Cost(Q,S), then the set $\{T_1.a, T_2.b\}$ is the set of critical statistics of S for strong equivalence with respect to the query Q.

The set of critical statistics of a given initial set of statistics S with respect to a query Q is a subset of every essential set of statistics of S with respect to query Q. The set of critical statistics of S with respect to a query Q may therefore be identified as a seed subset of statistics that may be grown to identify an essential set of statistics with respect to query Q. As the critical statistics for every query Q of a workload W 202 must be part of the essential set of statistics for workload W 202, the seed subset for workload W 202 is the union of the seed subsets for each query Q of workload W 202. Accordingly, the union of the critical statistics of a given initial set of statistics S with respect to each query Q of a workload W 202 is a subset of every essential set of statistics of S with respect to workload W 202.

ESSENTIAL STATISTICS IDENTIFICATION UTILITY TOOL

Figure 3:
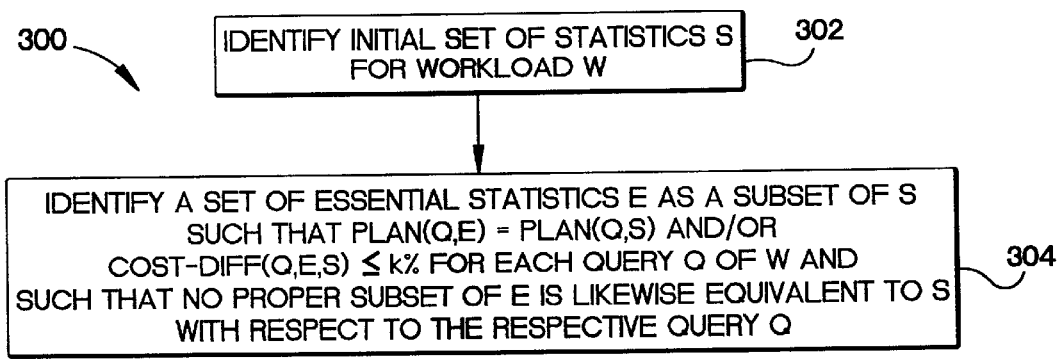
FIG. 3 illustrates a flow diagram for one example of a technique for identifying an essential set of statistics from an initial set of statistics.

Essential statistics identification utility tool 230 identifies a set of essential statistics E 204 in accordance with flow diagram 300 of FIG. 3.

For step 302 of FIG. 3, essential statistics identification utility tool 230 identifies an initial set of statistics S for a workload W 202 of one or more queries. Essential statistics identification utility tool 230 may identify the initial set of statistics from an existing or already constructed set of statistics or may generate the initial set of statistics S using any suitable technique.

For step 304 of FIG. 3, essential statistics identification utility tool 230 identifies an essential set of statistics E 204 as a subset of the initial set of statistics S that is equivalent to the initial set S with respect to each query Q of workload W 202. Essential statistics identification utility tool 230 for one example identifies an essential set of statistics E 204 for step 304 such that no proper subset of the essential set E 204 is likewise equivalent to the initial set S with respect to the respective query Q. Essential statistics identification utility tool 230 may identify an essential set of statistics E 204 in accordance with any suitable notion of minimality.

In identifying an essential set of statistics E 204, essential statistics identification utility tool 230 invokes query optimizer 224 to obtain an execution plan Plan(Q, S') and/or an estimated cost Cost(Q,S') for a query Q when a set of statistics S' is available to query optimizer 224.

For one example, as illustrated in FIG. 2, essential statistics identification utility tool 230 issues to database server 220 a set statistics subset command 232 to specify a set of statistics S' available to query optimizer 224 and issues a request to optimize command 234 specifying a query Q to request an execution plan Plan(Q,S') and/or an estimated cost Cost(Q,S') from query optimizer 224. Essential statistics identification utility tool 230 for one example invokes query optimizer 224 in a no-execution mode so as to request plan 236 from query optimizer 224 without actually executing that plan. Query optimizer 224 returns to essential statistics identification utility tool 230 a plan 236 comprising the requested execution plan Plan(Q,S') and/or estimated cost Cost(Q,S') to execute query Q using the specified set of statistics S'.

Where database server 220 comprises the Microsoft® SQL Server, query optimizer 224 by default considers all available statistics during query optimization. To obtain an execution plan and/or an estimated cost of a query using only a subset of the available statistics, the Microsoft® SQL Server may be extended to support an interface for set statistics subset command 232.

One exemplary interface is Ignore_Statistics_Subset (db_id, stat_id_list), where db_id is an identifier for database 210 and stat_id_list is a list of statistics that are to be ignored during query optimization. To implement this call, the information passed in by essential statistics identification utility tool 230 is stored in a connection specific buffer in database server 220. Making the call connection specific allows multiple client tools to operate concurrently. Subsequently, when a query is optimized from the same connection, query optimizer 224 ignores the subset of statistics in the buffer.

Another exemplary interface is Set_Statistics_Subset (db_id, table_id, stat_id_list), where db_id is an identifier for database 210, table_id is an identifier for a table in database 210, and stat_id_list is a list of statistics on the identified table for consideration by query optimizer 224. This call may be similarly implemented as Ignore_ Statistics_Subset(db_id, stat_id_list) only query optimizer 224 is to consider only the subset of statistics in the connection specific buffer for query optimization.

Query optimizer 224 returns plan 232 through the Showplan interface of the Microsoft® SQL Server. The information returned include the total estimated cost of each node in an execution plan tree, the operators in the plan and their arguments, and the parent-child relationship between operators in the plan. As the plan returned from the Microsoft® SQL Server may be stored as a string, essential statistics identification utility tool 230 can compare two plans using a string comparison operation.

SHRINKING SET TECHNIQUE

For one example, essential statistics identification utility tool 230 may identify an essential set of statistics E 204 for step 304 of FIG. 3 in accordance with a suitable shrinking set technique.

A shrinking set technique identifies an essential set of statistics with respect to a workload W 202 by removing one or more statistics from the initial set of statistics S and identifying the remaining statistics as an essential set if the remaining statistics remain equivalent to the initial set S with respect to every query Q of workload W 202. If no more statistics can be removed from the remaining statistics without losing this equivalence, the remaining statistics constitute a simple essential set.

Figure 4:
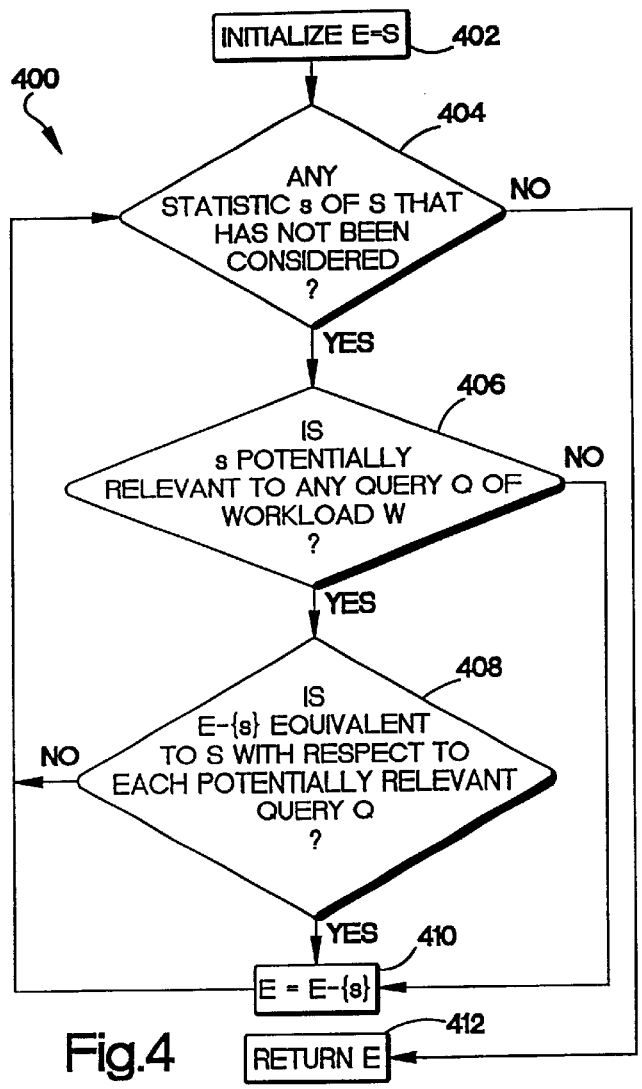
FIG. 4 illustrates a flow diagram for one example of a shrinking set technique for identifying an essential set of statistics.

One suitable shrinking set technique is illustrated in FIG. 4 as flow diagram 400. For step 402 of FIG. 4, the essential set of statistics E is initialized as the initial set of statistics S. For step 404, a statistic s that has not been previously considered from the initial set S is selected for consideration.

If the selected statistic s is potentially relevant to the execution of any one or more queries Q of workload W 202, each such query Q is selected for consideration for step 406. A statistic s may be potentially relevant to a query Q in accordance with any suitable notion of relevance. As one example, a statistic s may be potentially relevant to a query Q if the statistic s is on a column that occurs in (a) a WHERE clause, e.g., a selection or join condition, (b) a HAVING clause, and/or (c) a GROUP BY clause or equivalently a SELECT DISTINCT clause of query Q. Statistics on a column in a selection condition and on columns in a join condition can be used to help estimate the selectivity of the predicate. Similarly, statistics on a column in a GROUP BY clause can be used to help estimate the number of groups, that is distinct values, in the column.

As one example where a query Q is SELECT EmpName, Sum (Quantity*UnitPrice) FROM Sales WHERE Order-Date BETWEEN '10-01-98' AND '12-31-98' GROUP BY EmpName, statistics on Sales.OrderDate and Sales.EmpName are potentially relevant for optimization of the query Q.

If the currently identified essential set of statistics E would not lose its equivalence to the initial set S with respect to each selected query Q by removal of the selected statistic s, as determined for step 408, the selected statistic s is then removed from the currently identified essential set of statistics E for step 410. Otherwise, if the currently identified essential set of statistics E would lose its equivalence to the initial set S with respect to any one selected query Q by removal of the selected statistic s, the statistic s is retained in the essential set E.

If the selected statistic s is not potentially relevant to any query Q of workload W 202 as determined for step 406, the selected statistic s is then removed from the currently identified essential set of statistics E for step 410 as the removal of the selected statistic s would presumably not result in the currently identified essential set of statistics E losing its equivalence to the initial set S with respect to any query Q of workload W 202.

Steps 404–410 are repeated to consider every statistic s of the initial set S. When every statistic s of the initial set S has been considered, the resulting essential set of statistics E constitutes a simple essential set of statistics and is returned for step 412.

The shrinking set technique of FIG. 4 runs in time linear in the number of statistics in the initial set S. The running time, however, is dominated by the cost of step 408 in determining whether the removal of a selected statistic s would result in the currently identified essential set of statistics E losing its equivalence to the initial set S with respect to any potentially relevant query Q of workload W 202 as query optimizer 224 is invoked for each such determination. Although query optimizer 224 needs to be invoked only with respect to each query Q that is potentially relevant to a selected statistic s and even then only so long as the selected statistic s is not determined to be essential for step 408, optimizing complex queries is nevertheless time consuming. Furthermore, when the shrinking set technique runs from a client process, the overhead of crossing process boundaries between the client and server processes can be high.

Essential statistics identification utility tool 230 may attempt to reduce the number of calls to query optimizer 224 by quickly identifying from the initial set S an essential set of statistics S' for many queries Q of workload W 202 and then considering only those remaining queries Q of workload W 202 for which S' is not equivalent to S. As two examples, essential statistics identification utility tool 230 may identify an essential set of statistics E 204 in accordance with a suitable workload-cost-based shrinking set technique or a suitable per-statistic-based shrinking set technique.

WORKLOAD-COST-BASED SHRINKING SET TECHNIQUE

A workload-cost-based shrinking set technique performs a shrinking set technique on a set of relatively more expensive queries of workload W 202 to identify an essential set S' for such queries. A shrinking set technique is then performed to identify an essential set S" for those remaining queries of workload W 202 for which S' in not equivalent to S. An essential set E 204 for workload W 202 is then identified as the union of the essential sets S' and S".

Figure 5:
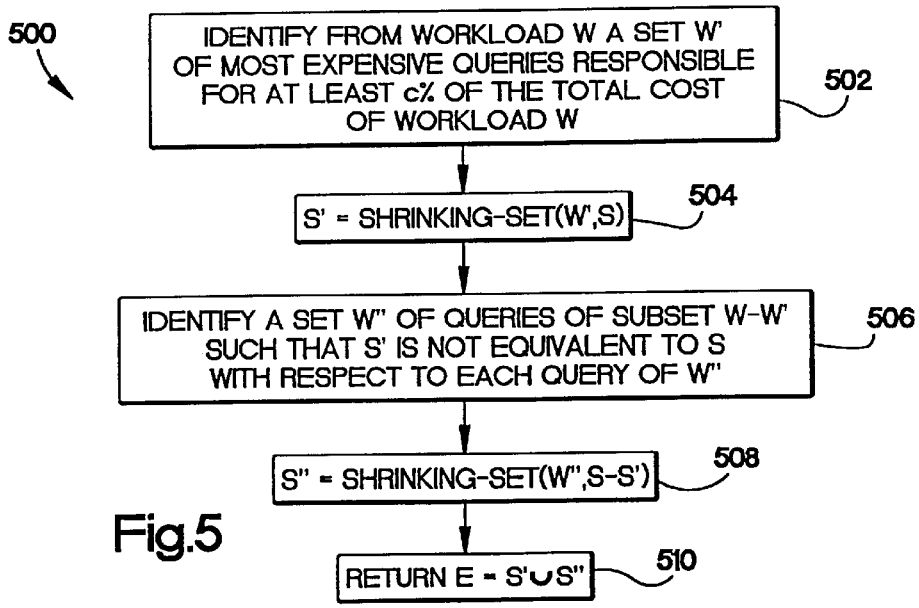
FIG. 5 illustrates a flow diagram for one example of a workload-cost-based shrinking set technique for identifying an essential set of statistics.

One suitable shrinking set technique is illustrated in FIG. 5 as flow diagram 500. For step 502 of FIG. 5, a set W' of the most expensive queries of workload W 202 responsible for at least a predetermined percentage c % of the total cost of workload W 202 is identified. The predetermined percentage c % may be any suitable value, such as a value in the range of approximately 15% to approximately 25% for example, and may be preset or input by a database administrator, for example. An essential set S' with respect to the most expensive query set W' is then identified for step 504 from the initial set S using a suitable shrinking set technique such as that of FIG. 4 for example.

For step 506, a set W" of queries from the remaining query subset W–W' is identified such that the essential set S' is not equivalent to the initial set S with respect to each query of the set W". An essential set S" with respect to the query set W" is then identified for step 508 from the remaining subset S–S' using a suitable shrinking set technique such as that of FIG. 4 for example. An essential set E 204 for workload W 202 is then returned for step 510 as the union of the essential sets S' and S".

PER-STATISTIC-BASED SHRINKING SET TECHNIQUE

A per-statistic-based shrinking set technique associates with each statistic s of the initial set S a number of expensive queries from workload W 202 for which the statistic s is potentially relevant and determines if the statistic s is essential for any such queries. Performing this technique for each statistic s of S forms an essential set S'. A shrinking set technique is then performed to identify an essential set S" for those remaining queries of workload W 202 for which S' in not equivalent to S. An essential set E 204 for workload W 202 is then identified as the union of the essential sets S' and S".

Figure 6:
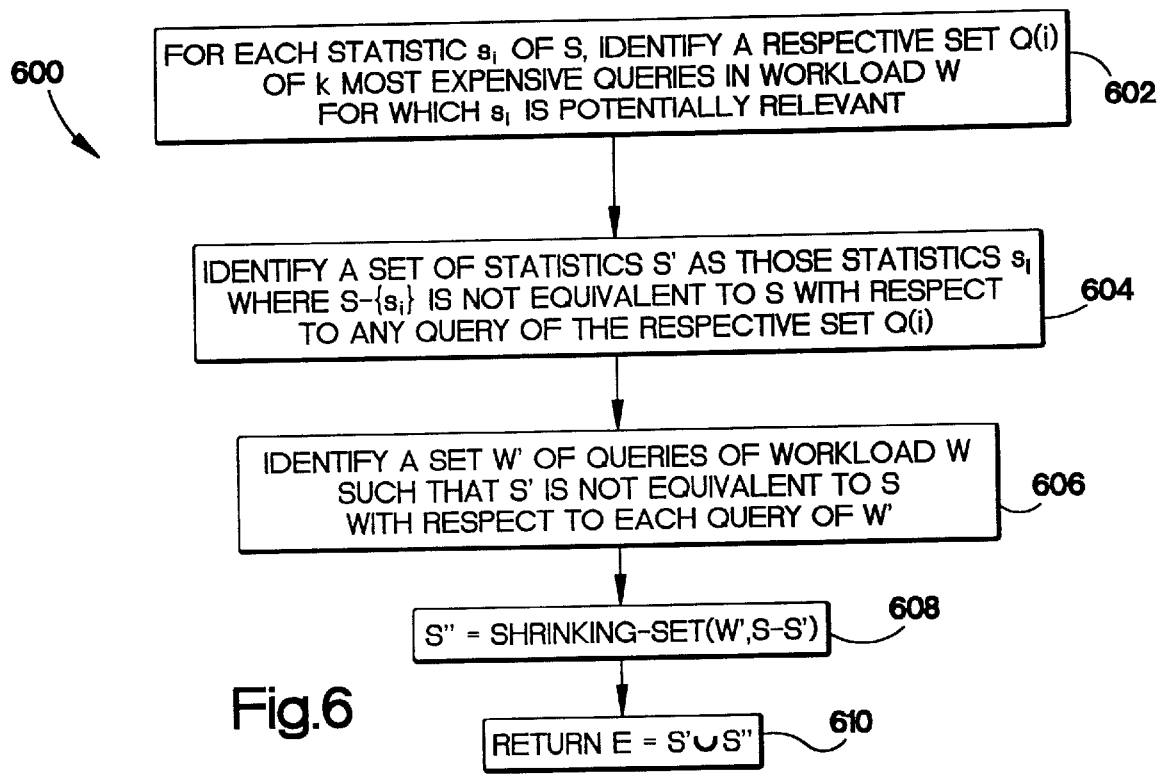
FIG. 6 illustrates a flow diagram for one example of a per-statistic-based shrinking set technique for identifying an essential set of statistics.

One suitable shrinking set technique is illustrated in FIG. 6 as flow diagram 600. For each statistic $s_i$ of the initial set S, a respective set Q(i) of at most a predetermined number k of the most expensive queries for which the statistic $s_i$ is potentially relevant is identified for step 602 from workload W 202. The predetermined number k may be any suitable number, such as a number in the range of approximately 3 to approximately 5 for example, and may be preset or input by a database administrator, for example. An essential set of statistics S' is then identified for step 604 as those statistics $s_i$ that are essential to any query of their respective set Q(i), that is where S-$\{s_i\}$ is not equivalent to S with respect to any one query of the respective set Q(i).

For step 606, a set W' of queries from workload W 202 is identified such that the essential set S' is not equivalent to the initial set S with respect to each query of the set W'. An essential set S" with respect to the query set W' is then identified for step 608 from the remaining subset S–S' using a suitable shrinking set technique such as that of FIG. 4 for example. An essential set E 204 for workload W 202 is then returned for step 510 as the union of the essential sets S' and S".

SUBSET ENUMERATION TECHNIQUE

For another example, essential statistics identification utility tool 230 may identify an essential set of statistics E 204 for step 304 of FIG. 3 in accordance with a suitable subset enumeration technique.

A subset enumeration technique identifies an essential set of statistics with respect to a workload W 202 by enumerating over subsets S' of the initial set of statistics S. The technique may enumerate over the subsets S' in a suitable order until a subset S' is identified as equivalent to the initial set S.

Figure 7:
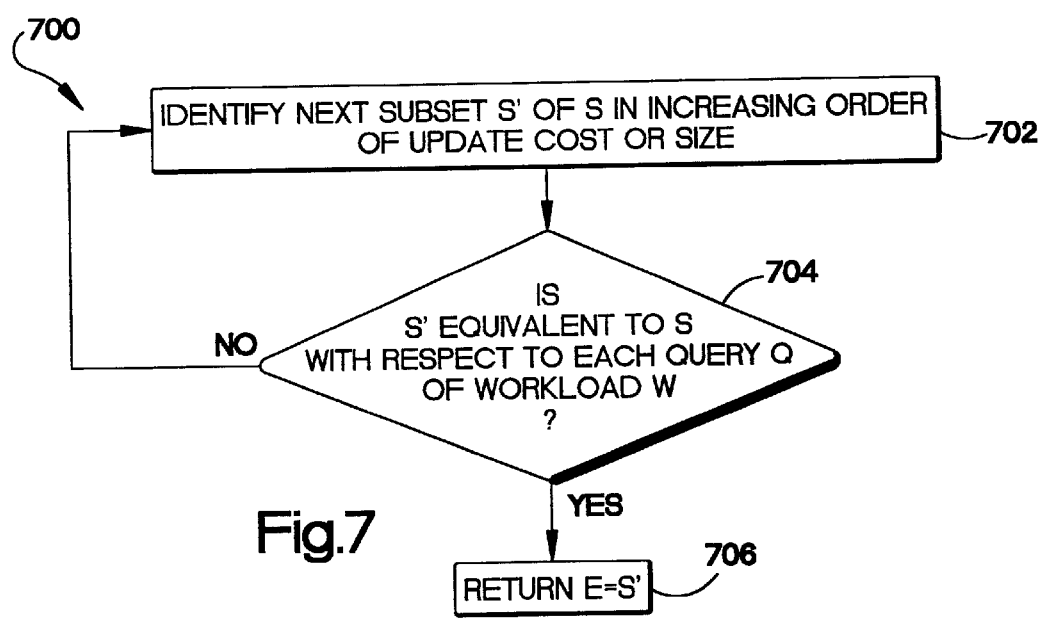
FIG. 7 illustrates a flow diagram for one example of a subset enumeration technique for identifying an essential set of statistics.

One suitable subset enumeration technique is illustrated in FIG. 7 as flow diagram 700. For step 702 of FIG. 7, a next subset of statistics S' from the initial set S is identified in increasing order of update cost, size, or any other suitable ordering criteria. If the identified subset S' is equivalent to the initial set S with respect to each query Q of workload W 202, as determined for step 704, the identified subset S' is returned as an essential set of statistics E for step 706. Otherwise, if the identified subset S' is not equivalent to the initial set S with respect to each query Q of workload W 202, steps 702–704 are repeated until a subset S' is identified as equivalent to the initial set S.

If the subsets S' are identified in increasing order of update cost, the subset enumeration technique returns an update-cost-minimal essential set for step 706. If the subsets S' are identified in increasing order of size, the subset enumeration technique returns a memory-minimal essential set for step 706.

Other suitable subset enumeration techniques may exhaustively enumerate over all subsets S' of the initial set S and select based on one or more suitable criteria from the subset(s) S' determined to be equivalent to the initial set S with respect to each query Q of workload W 202.

CRITICAL SET IDENTIFICATION

Essential statistics identification utility tool 230 for other examples may identify an essential set of statistics E 204 for step 304 of FIG. 3 in accordance with a suitable critical set growing technique.

As the set of critical statistics of the initial set of statistics S with respect to a query Q is a subset of every essential set of statistics of S with respect to query Q, a critical set growing technique identifies a critical set of statistics with respect to each query Q of workload W 202 and augments or grows the critical set to identify an essential set for workload W 202.

Where workload W 202 has queries $Q_1, Q_2, \ldots Q_k$, the critical set $R_1$ for query Q may be identified and then augmented to identify an essential set $E_1$ for query $Q_1$. This technique may then be repeated for the next query $Q_i$ until an essential set has been identified for each query of workload W 202 and used to form an essential set E 204 for workload W 202. Because a critical statistic for a query $Q_j$ may be a member of the set $E_i$–$R_i$ for another query $Q_i$, identifying the critical set for all queries in workload W 202 prior to augmenting the critical set for any one query in workload W 202 may prove more beneficial.

As one example where workload W 202 has two queries $Q_1$ and $Q_2$, the critical set $R_1=\{T_1.a, T_2.b\}$, the critical set $R_2=\{T_3.c, T_4.d\}$, and the essential set $E_1=\{T_1.a, T_2.b, T_3.c\}$, no augmentation is required to identify the essential set $E_1$ based on the computed critical set $R=R_1 \cup R_2$ for workload W 202, noting $T_3.c$ is a critical statistic for query $Q_2$.

Essential statistics identification utility tool 230 may identify a critical set of statistics from the initial set of statistics S with respect to each query Q of workload W 202 in accordance with a suitable critical set identification technique.

A critical set identification technique identifies a statistic s of the initial set S as critical to each query Q of workload W 202 if the statistic s were removed from the initial set S and the remaining subset of statistics S–$\{s\}$ is not equivalent to the initial set S with respect to each query Q of workload W 202.

Figure 8:
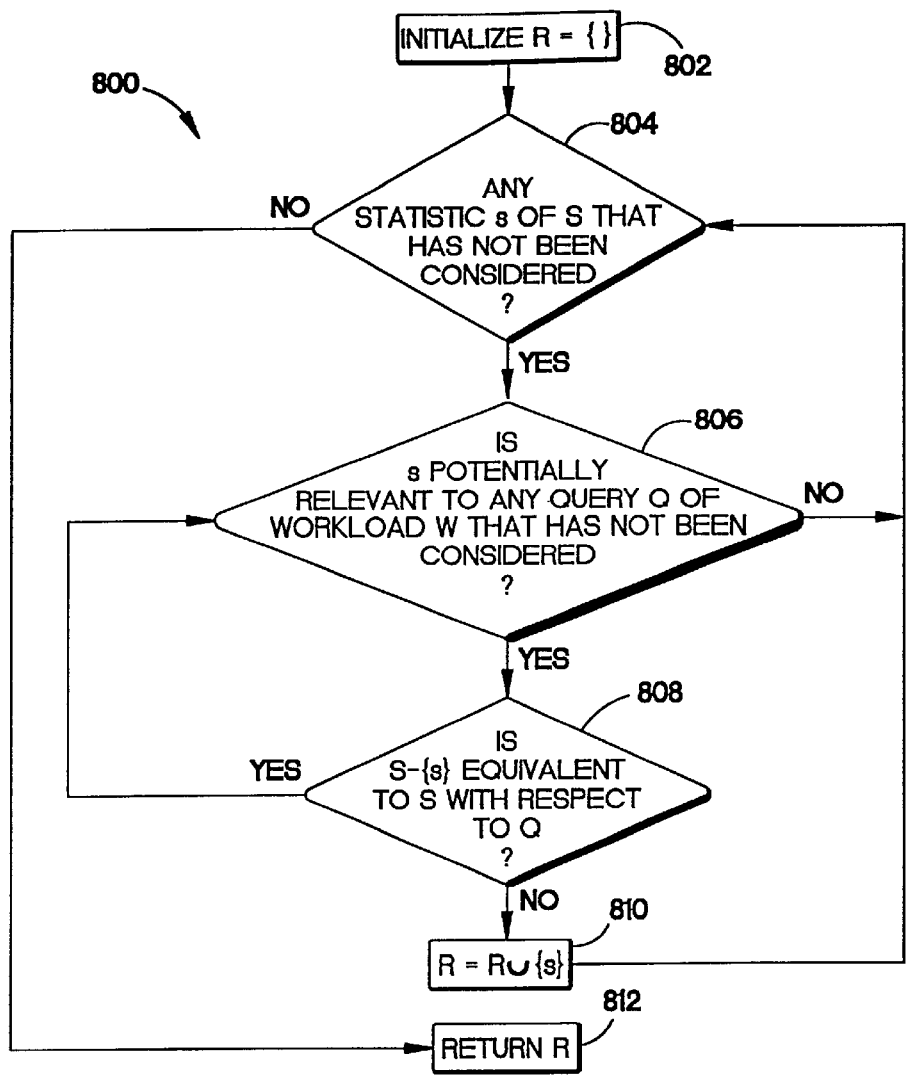
FIG. 8 illustrates a flow diagram for one example of a technique for identifying a critical set of statistics from an initial set of statistics.

One suitable critical set identification technique is illustrated in FIG. 8 as flow diagram 800. For step 802 of FIG. 8, a critical set R is initialized as an empty set. For step 804, a statistic s that has not been previously considered from the initial set S is selected for consideration.

If the selected statistic s is potentially relevant to the execution of a query Q that has not been previously considered from workload W 202 with respect to the selected statistic s, the query Q is selected for consideration for step 806.

If the initial set of statistics S absent the selected statistic s, that is the subset of statistics S–$\{s\}$, is not equivalent to the initial set S with respect to the selected query Q, as determined for step 808, the selected statistic s is identified as a critical statistic and added to the critical set R for step 810. Otherwise, if the subset S–$\{s\}$ is equivalent to the initial set S with respect to the selected query Q, steps 806–808 are repeated until all queries Q potentially relevant to the selected statistic s have been considered as determined for step 806 or until the selected statistic s is identified as critical for step 808.

Steps 804–810 are repeated to consider every statistic s of the initial set S. When every statistic s of the initial set S has been considered, the resulting critical set R is returned for step 812.

The identified critical set for workload W 202 may then be augmented or grown with one or more additional statistics, if necessary, in accordance with a suitable technique to identify an essential set of statistics E 204 for workload W 202.

CRITICAL SET SUBSET ENUMERATION GROWING TECHNIQUE

For one example, essential statistics identification utility tool 230 may identify an essential set of statistics E 204 by growing the critical set R for workload W 202 in accordance with a suitable critical set subset enumeration growing technique.

A critical set subset enumeration growing technique identifies from the initial set of statistics S the critical set R for workload W 202 and then augments the critical set by enumerating over subsets P' of the remaining statistics P=S−R. The technique may enumerate over the subsets P' in a suitable order until a subset R∪P' is identified as equivalent to the initial set S.

Figure 9:
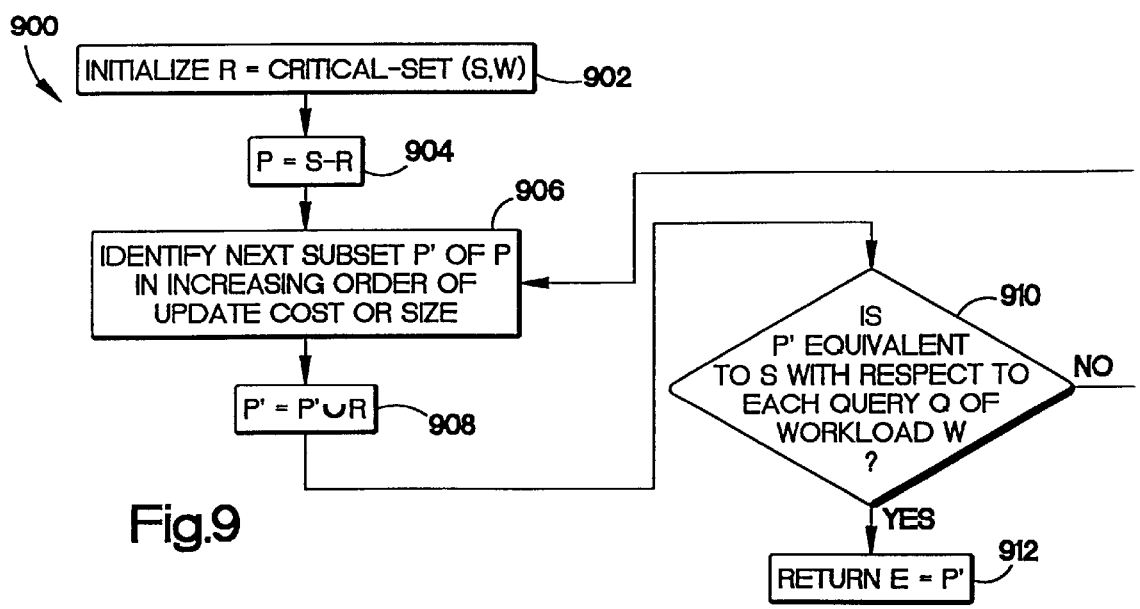
FIG. 9 illustrates a flow diagram for one example of a critical set subset enumeration growing technique for identifying an essential set of statistics.

One suitable critical set subset enumeration growing technique is illustrated in FIG. 9 as flow diagram 900. For step 902 of FIG. 9, the critical set R for workload W 202 is identified from the initial set of statistics S using a suitable critical set identification technique such as that of FIG. 8. For step 904, the remaining subset of statistics P=S−R is identified.

For step 906, a next subset of statistics P' from the subset P is identified in increasing order of update cost, size, or any other suitable ordering criteria. If the union of the identified subset P' with the critical set R, as determined for step 908, is equivalent to the initial set S with respect to each query Q of workload W 202, as determined for step 910, that union is returned as an essential set of statistics E for step 912. Otherwise, if the union of the identified subset P' with the critical set R is not equivalent to the initial set S with respect to each query Q of workload W 202, steps 906–910 are repeated until an essential set E 204 is identified.

If the subsets P' are identified in increasing order of update cost, the critical set subset enumeration growing technique returns an update-cost-minimal essential set for step 912. If the subsets P' are identified in increasing order of size, the critical set subset enumeration growing technique returns a memory-minimal essential set for step 912.

As one example where the subsets P' are enumerated in increasing order of update-cost and the remaining subset P=S−R={a(2), b(3), c(20), d(22)} with the numbers in parentheses representing the update cost for each associated statistic, the critical set subset enumeration growing technique enumerates over the subsets P' in the following order: {}(0), {a}(2), {b}(3), {a,b}(5), {c}(20), {a,c}(22), {d}(22), {b,c}(23), {a,d}(24), {b,d}(25), {a,b,c}(25), {a,b,d}(27), {c,d}(42), {a,c,d}(44), {b,c,d}(45), {a,b,c,d}(49).

Other suitable critical set subset enumeration growing techniques may exhaustively enumerate over all subsets P' and select based on one or more suitable criteria from the subset(s) P' whose union with the critical set R is determined to be equivalent to the initial set S with respect to each query Q of workload W 202.

CRITICAL SET PARTITION GROWING TECHNIQUE

For another example, essential statistics identification utility tool 230 may identify an essential set of statistics E 204 by growing the critical set R for workload W 202 in accordance with a suitable critical set partition growing technique.

A critical set partition growing technique stems from the notion that if statistics from different relations do not interact significantly, then finding an essential set for each relation in each query Q of workload W 202 can be used to find an essential set for workload W 202. Indeed, statistics from different relations that do interact may already be members of the critical set for workload W 202.

As an example of a technique for this notion, the initial set of statistics S can be divided into partitions, each corresponding to a separate table in the one query Q of workload W 202. An essential set for the one query Q may then be identified by enumerating over the subsets of each partition and identifying a subset of each partition such that the union of the identified partition subsets is equivalent to the initial set of statistics. This technique may be repeated for each query Q of workload W 202 to identify an essential set for workload W 202.

As one example where a query Q is SELECT*from $T_1$, $T_2$ WHERE $T_1.a=T_2.b$ AND $T_1.c<10$ AND $T_2.d=20$, the technique may place statistics on tables $T_1$ and $T_2$ from the initial set S in different partitions. The technique may then enumerate over the subsets of the table $T_1$ partition to identify a subset of the table $T_1$ partition such that the union of the identified subset of the table $T_1$ partition with the statistics of the table $T_2$ partition is equivalent to the initial set S. Given the identified subset of the table $T_1$ partition is $\{T_1.a\}$, the technique may then enumerate over the subsets of the table $T_2$ partition to identify a subset of the table $T_2$ partition such that the union of the identified subset of the table $T_2$ partition with the identified subset of the table $T_1$ partition, that is with $\{T_1.a\}$, is equivalent to the initial set S. Given the identified subset of the table $T_2$ partition is $\{T_2.b\}$, the technique identifies $\{T_1.a, T_2.b\}$ as an essential set for the query Q.

Because any essential set for workload W 202 comprises the critical set R for workload W 202, a critical set partition growing technique identifies the critical set R for workload W 202 and then augments the critical set R by enumerating, for each query Q of workload W 202, over subsets of partitions formed from the remaining statistics S−R for each table in the query Q.

Figure 10:
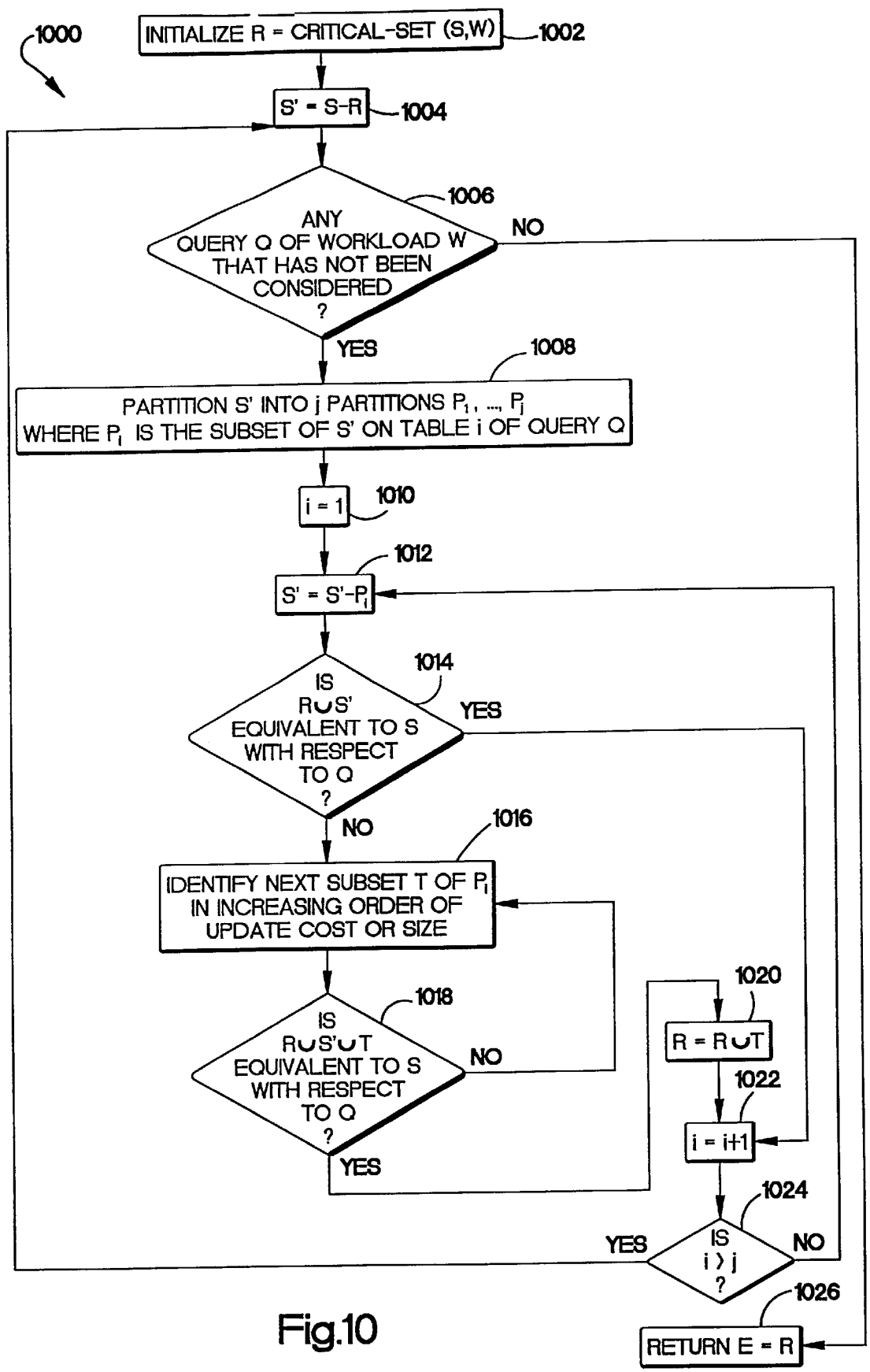
FIG. 10 illustrates a flow diagram for one example of a critical set partition growing technique for identifying an essential set of statistics.

One suitable critical set partition growing technique is illustrated in FIG. 10 as flow diagram 1000. For step 1002 of FIG. 10, the critical set R for workload W 202 is identified from the initial set of statistics S using a suitable critical set identification technique such as that of FIG. 8. For step 1004, the remaining subset of statistics S'=S−R is identified.

For step 1006, a next query Q that has not been previously considered from workload W 202 is selected for consideration. The subset S' is partitioned for step 1008 into j partitions $P_1, \ldots P_j$ where $P_i$ is the subset of statistics of S' on table i of the selected query Q. Because one or more statistics of the subset S' may not belong in a partition $P_i$, the subset S' may not be fully partitioned. The variable i is initialized to one for step 1010, and the subset S' is redefined for step 1012 by removing all statistics of the partition $P_i$ from the subset S'.

If the union of the redefined subset S' with the current set R is not equivalent to the initial set S with respect to the selected query Q, as determined for step 1014, a next subset of statistics T from the partition $P_i$ is identified for step 1016 in increasing order of update cost, size, or any other suitable ordering criteria. If the union of the identified subset T with the redefined subset S' and the current set R is equivalent to the initial set S with respect to the selected query Q, as determined for step 1018, the current set R is redefined by adding the subset T to the current set R for step 1020. Otherwise, if the union of the identified subset T with the redefined subset S' and the current set R is not equivalent to the initial set S with respect to the selected query Q, steps 1016 and 1018 are repeated until the union of a next subset T with the redefined subset S' and the current set R is equivalent to the initial set S with respect to the selected query Q. If the union of the redefined subset S' with the current set R is equivalent to the initial set S with respect to the selected query Q, as determined for step 1014, the current set R is not redefined for partition $P_i$.

The variable i is incremented for step 1022 and compared to j for step 1024 to determine whether any partitions for the selected query Q remain for consideration. If so, steps 1012–1024 are repeated until all partitions $P_1, \ldots, P_j$ for the selected query Q have been considered as determined for step 1024.

Steps 1004–1024 are then repeated to consider partitions for any other queries Q of workload W 202. When all queries of workload W 202 have been considered, as determined for step 1006, the current set R is returned as an essential set E 204 for step 1026.

WORKLOAD COMPRESSION

The cost in time to identify an essential set of statistics E 204 for step 304 increases as the size of workload W 202 increases. Essential statistics identification utility tool 230 may attempt to reduce this overhead by performing a suitable workload compression technique in which an essential set of statistics E 204 is identified with respect to only a fraction of the number of queries Q of workload W 202, that is with respect to a compressed workload W'. The more statistics are shared across multiple queries in workload W 202, the more statistics relevant to workload W 202 will be considered in identifying an essential set E 204. Any suitable criteria may be used to compress workload W 202 into a workload W'.

For one exemplary workload compression technique, essential statistics identification utility tool 230 may perform steps 502 and 504 of FIG. 5 to identify an essential set S' with respect to a compressed workload W' and return an essential set of statistics E 204 for workload W 202 as the identified essential set S'.

That is, a set W of the most expensive queries Q of workload W 202 responsible for at least a predetermined percentage c % of the total cost of workload W 202 is identified. Where the execution cost of each query Q in workload W 202 is logged along with each query Q in workload W 202, such a compressed workload W' may be readily identified. The predetermined percentage c % may be any suitable value, such as a value in the range of approximately 15% to approximately 25% for example, and may be preset or input by a database administrator, for example.

An essential set S' with respect to the most expensive query set W' is then identified from the initial set S using a suitable shrinking set technique such as that of FIG. 4 for example. An essential set of statistics E 204 for workload W 202 is then returned as the identified essential set S'. For another example, this technique may be adapted to identify an essential set S' from among only those statistics of the initial set S that are potentially useful in at least c % of the total cost of workload W 202.

DROPPING NON-ESSENTIAL STATISTICS

Once an essential set of statistics E 204 has been identified, the remaining or non-essential statistics of the initial set S may be dropped or removed from database server 220. Non-essential statistics may be dropped individually or in groups, such as all non-essential statistics on a table for example, and may be dropped in accordance with any suitable technique.

For one example, non-essential statistics may be dropped when the cost of maintaining them is high. Where database server 220 comprises Microsoft® SQL Server, for example, a row-modification-counter for each table is maintained to record the number of rows modified in the table since the last update of statistics on the table. Database server 220 updates statistics on the table when the counter for the table exceeds a fraction, such as 0.2 for example, of the table size. When a statistic identified as non-essential has been updated more than a predetermined amount of time, the non-essential statistic may be physically dropped from database server 220.

In the foregoing description, the invention has been described with reference to specific exemplary embodiments thereof It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method for identifying statistics for use in executing one or more queries against a database, the method comprising the steps of:
   (a) identifying an initial set of statistics; and
   (b) identifying a subset of the initial set of statistics equivalent to the initial set of statistics with respect to each query, wherein the subset of statistics is equivalent to the initial set of statistics:
      (i) if an execution plan for each query using the subset of statistics is the same as an execution plan for that query using the initial set of statistics, and/or
      (ii) if a cost estimate to execute each query against the database using the subset of statistics is within a predetermined amount of a cost estimate to execute that query against the database using the initial set of statistics.

2. The method of claim 1, wherein the identifying step (b) comprises the step of identifying the subset of statistics such that any proper subset of the subset of statistics is not equivalent to the initial set of statistics with respect to each query.

3. The method of claim 1, wherein the predetermined amount is a predetermined percentage of the cost estimate to execute that query against the database using the initial set of statistics.

4. The method of claim 1, wherein the predetermined amount is zero.

5. The method of claim 1, wherein the identifying step (b) comprises the step of identifying the subset of statistics such that an update cost or size for the subset of statistics is minimized.

6. The method of claim 1, wherein the identifying step (b) comprises the step of identifying the subset of statistics by removing statistics from the initial set of statistics if the remaining subset of statistics is equivalent to the initial set of statistics with respect to each query.

7. The method of claim 6, comprising the step of identifying the one or more queries from a workload of queries as the one or more queries that have estimated execution costs greater than any other query of the workload and that account for at least a predetermined percentage of a total estimated execution cost for the workload.

8. The method of claim 7, further comprising the steps of:
   (c) identifying each query of the workload such that the subset of statistics is not equivalent to the initial set of statistics with respect to that query, and
   (d) identifying another subset of statistics by removing statistics from the initial set of statistics if the remaining subset of statistics is equivalent to the initial set of statistics with respect to each query identified in step (c).

9. The method of claim 6, comprising the steps of:
   for each statistic of the initial set of statistics, identifying from a workload of queries a respective set of queries such that that statistic is potentially relevant to each query in the respective query set and such that each query in the respective query set has estimated execution costs greater than any other potentially relevant query of the workload;
   for each statistic of the initial set of statistics, determining whether the initial set of statistics without that statistic is equivalent to the initial set of statistics with respect to each query in the respective query set, and, if not, including that statistic in a first subset of statistics; and identifying the one or more queries from the workload as each query of the workload such that the first subset of statistics is not equivalent to the initial set of statistics with respect to that query.

10. The method of claim 1, wherein the identifying step (b) comprises the steps of:
   (i) identifying a subset of the initial set of statistics,
   (ii) determining whether the subset of statistics identified in step (b)(i) is equivalent to the initial set of statistics with respect to each query, and
   (iii) repeating steps (b)(i) and (b)(ii) for other subsets of the initial set of statistics.

11. The method of claim 10, wherein the identifying step (b)(i) identifies subsets of the initial set of statistics in increasing order of update cost or size.

12. The method of claim 10, wherein the repeating step (b)(iii) comprises the step of repeating steps (b)(i) and (b)(ii) until the subset of statistics identified in step (b)(i) is equivalent to the initial set of statistics with respect to each query.

13. The method of claim 1, wherein the identifying step (b) comprises the steps of:
   (i) identifying a seed subset of the initial set of statistics,
   (ii) adding a subset of the remaining subset of the initial set of statistics to the seed subset to produce a current subset of statistics,
   (iii) determining whether the current subset of statistics is equivalent to the initial set of statistics with respect to each query, and
   (iv) repeating steps (b)(ii) and (b)(iii) for other subsets of the remaining subset of the initial set of statistics.

14. The method of claim 13, wherein the identifying step (b)(i) comprises the steps of determining whether the initial set of statistics without any one statistic of the initial set of statistics is equivalent to the initial set of statistics with respect to each query, and, if not, including the one statistic in the seed subset.

15. The method of claim 13, wherein the adding step (b)(ii) identifies subsets of the remaining subset of the initial set of statistics in increasing order of update cost or size.

16. The method of claim 13, wherein the repeating step (b)(iv) comprises the step of repeating steps (b)(ii) and (b)(iii) until the current subset of statistics is equivalent to the initial set of statistics with respect to each query.

17. The method of claim 1, wherein the identifying step (b) comprises the steps of:
   (i) partitioning statistics of the initial set of statistics into partitions such that each partition comprises statistics on a respective table of one of the one or more queries,
   (ii) identifying a subset of each partition such that the combined partition subsets are equivalent to the initial set of statistics with respect to the one query, and
   (iii) repeating steps (b)(i) and (b)(ii) for each query.

18. The method of claim 17, wherein the identifying step (b)(ii) comprises the step of identifying each partition subset such that an update cost or size for each partition subset is minimized.

19. The method of claim 1, wherein the identifying step (b) comprises the steps of:
   (i) identifying a seed subset of the initial set of statistics,
   (ii) partitioning statistics of the remaining subset of the initial set of statistics into partitions such that each partition comprises statistics on a respective table of one of the one or more queries,
   (iii) identifying a subset of each partition such that the combined partition subsets and seed subset are equivalent to the initial set of statistics with respect to the one query, and
   (iv) repeating steps (b)(ii) and (b)(iii) for each query.

20. The method of claim 19, wherein the identifying step (b)(i) comprises the steps of determining whether the initial set of statistics without any one statistic of the initial set of statistics is equivalent to the initial set of statistics with respect to each query, and, if not, including the one statistic in the seed subset.

21. The method of claim 19, wherein the identifying step (b)(iii) comprises the step of identifying each partition subset such that an update cost or size for each partition subset is minimized.

22. A computer readable medium having computer-executable instructions for identifying statistics for use in executing one or more queries against a database, the computer-executable instructions for performing the steps of;
   (a) identifying an initial set of statistics; and
   (b) identifying a subset of the initial set of statistics equivalent to the initial set of statistics with respect to each query, wherein the subset of statistics is equivalent to the initial set of statistics:
      (i) if an execution plan for each query using the subset of statistics is the same as an execution plan for that query using the initial set of statistics, and/or
      (ii) if a cost estimate to execute each query against the database using the subset of statistics is within a predetermined amount of a cost estimate to execute that query against the database using the initial set of statistics.

23. The computer readable medium of claim 22, wherein the identifying step (b) comprises the step of identifying the subset of statistics such that any proper subset of the subset of statistics is not equivalent to the initial set of statistics with respect to each query.

24. The computer readable medium of claim 22, wherein the predetermined amount is a predetermined percentage of the cost estimate to execute that query against the database using the initial set of statistics.

25. The computer readable medium of claim 22, wherein the predetermined amount is zero.

26. The computer readable medium of claim 22, wherein the identifying step (b) comprises the step of identifying the subset of statistics such that an update cost or size for the subset of statistics is minimized.

27. The computer readable medium of claim 22, wherein the identifying step (b) comprises the step of identifying the subset of statistics by removing statistics from the initial set of statistics if the remaining subset of statistics is equivalent to the initial set of statistics with respect to each query.

28. The computer readable medium of claim 27, comprising the step of identifying the one or more queries from a workload of queries as the one or more queries that have estimated execution costs greater than any other query of the workload and that account for at least a predetermined percentage of a total estimated execution cost for the workload.

29. The computer readable medium of claim 28, further comprising the steps of:
   (c) identifying each query of the workload such that the subset of statistics is not equivalent to the initial set of statistics with respect to that query, and
   (d) identifying another subset of statistics by removing statistics from the initial set of statistics if the remaining subset of statistics is equivalent to the initial set of statistics with respect to each query identified in step (c).

30. The computer readable medium of claim 27, comprising the steps of:

for each statistic of the initial set of statistics, identifying from a workload of queries a respective set of queries such that that statistic is potentially relevant to each query in the respective query set and such that each query in the respective query set has estimated execution costs greater than any other potentially relevant query of the workload;

for each statistic of the initial set of statistics, determining whether the initial set of statistics without that statistic is equivalent to the initial set of statistics with respect to each query in the respective query set, and, if not, including that statistic in a first subset of statistics; and identifying the one or more queries from the workload as each query of the workload such that the first subset of statistics is not equivalent to the initial set of statistics with respect to that query.

31. The computer readable medium of claim 22, wherein the identifying step (b) comprises the steps of:

(i) identifying a subset of the initial set of statistics, (ii) determining whether the subset of statistics identified in step (b)(i) is equivalent to the initial set of statistics with respect to each query, and (iii) repeating steps (b)(i) and (b)(ii) for other subsets of the initial set of statistics.

32. The computer readable medium of claim 31, wherein the identifying step (b)(i) identifies subsets of the initial set of statistics in increasing order of update cost or size.

33. The computer readable medium of claim 31, wherein the repeating step (b)(iii) comprises the step of repeating steps (b)(i) and (b)(ii) until the subset of statistics identified in step (b)(i) is equivalent to the initial set of statistics with respect to each query.

34. The computer readable medium of claim 22, wherein the identifying step (b) comprises the steps of:

(i) identifying a seed subset of the initial set of statistics, (ii) adding a subset of the remaining subset of the initial set of statistics to the seed subset to produce a current subset of statistics, (iii) determining whether the current subset of statistics is equivalent to the initial set of statistics with respect to each query, and (iv) repeating steps (b)(ii) and (b)(iii) for other subsets of the remaining subset of the initial set of statistics.

35. The computer readable medium of claim 34, wherein the identifying step (b)(i) comprises the steps of determining whether the initial set of statistics without any one statistic of the initial set of statistics is equivalent to the initial set of statistics with respect to each query, and, if not, including the one statistic in the seed subset.

36. The computer readable medium of claim 34, wherein the adding step (b)(ii) identifies subsets of the remaining subset of the initial set of statistics in increasing order of update cost or size.

37. The computer readable medium of claim 34, wherein the repeating step (b)(iv) comprises the step of repeating steps (b)(ii) and (b)(iii) until the current subset of statistics is equivalent to the initial set of statistics with respect to each query.

38. The computer readable medium of claim 22, wherein the identifying step (b) comprises the steps of:

(i) partitioning statistics of the initial set of statistics into partitions such that each partition comprises statistics on a respective table of one of the one or more queries, (ii) identifying a subset of each partition such that the combined partition subsets are equivalent to the initial set of statistics with respect to the one query, and (iii) repeating steps (b)(i) and (b)(ii) for each query.

39. The computer readable medium of claim 38, wherein the identifying step (b)(ii) comprises the step of identifying each partition subset such that an update cost or size for each partition subset is minimized.

40. The computer readable medium of claim 22, wherein the identifying step (b) comprises the steps of:

(i) identifying a seed subset of the initial set of statistics, (ii) partitioning statistics of the remaining subset of the initial set of statistics into partitions such that each partition comprises statistics on a respective table of one of the one or more queries, (iii) identifying a subset of each partition such that the combined partition subsets and seed subset are equivalent to the initial set of statistics with respect to the one query, and (iv) repeating steps (b)(ii) and (b)(iii) for each query.

41. The computer readable medium of claim 40, wherein the identifying step (b)(i) comprises the steps of determining whether the initial set of statistics without any one statistic of the initial set of statistics is equivalent to the initial set of statistics with respect to each query, and, if not, including the one statistic in the seed subset.

42. The computer readable medium of claim 40, wherein the identifying step (b)(iii) comprises the step of identifying each partition subset such that an update cost or size for each partition subset is minimized.

43. A database system for identifying statistics for use in executing one or more queries against a database, the database system comprising:

(a) means for identifying an initial set of statistics; and (b) means for identifying a subset of the initial set of statistics equivalent to the initial set of statistics with respect to each query, wherein the subset of statistics is equivalent to the initial set of statistics:

(i) if an execution plan for each query using the subset of statistics is the same as an execution plan for that query using the initial set of statistics, and/or (ii) if a cost estimate to execute each query against the database using the subset of statistics is within a predetermined amount of a cost estimate to execute that query against the database using the initial set of statistics.

44. The database system of claim 43, wherein the identifying means (b) comprises means for identifying the subset of statistics such that any proper subset of the subset of statistics is not equivalent to the initial set of statistics with respect to each query.

45. The database system of claim 43, wherein the predetermined amount is a predetermined percentage of the cost estimate to execute that query against the database using the initial set of statistics.

46. The database system of claim 43, wherein the predetermined amount is zero.

47. The database system of claim 43, wherein the identifying means (b) comprises means for identifying the subset of statistics such that an update cost or size for the subset of statistics is minimized.

48. The database system of claim 43, wherein the identifying means (b) comprises means for identifying the subset of statistics by removing statistics from the initial set of statistics if the remaining subset of statistics is equivalent to the initial set of statistics with respect to each query.

49. The database system of claim 48, comprising means for identifying the one or more queries from a workload of queries as the one or more queries that have estimated execution costs greater than any other query of the workload and that account for at least a predetermined percentage of a total estimated execution cost for the workload.

50. The database system of claim 49, further comprising:
(c) means for identifying each query of the workload such that the subset of statistics is not equivalent to the initial set of statistics with respect to that query, and
(d) means for identifying another subset of statistics by removing statistics from the initial set of statistics if the remaining subset of statistics is equivalent to the initial set of statistics with respect to each query identified by the identifying means (c).

51. The database system of claim 48, comprising:
means for identifying from a workload of queries a respective set of queries for each statistic of the initial set of statistics such that that statistic is potentially relevant to each query in the respective query set and such that each query in the respective query set has estimated execution costs greater than any other potentially relevant query of the workload;
means for determining for each statistic of the initial set of statistics whether the initial set of statistics without that statistic is equivalent to the initial set of statistics with respect to each query in the respective query set, and, if not, including that statistic in a first subset of statistics; and
means for identifying the one or more queries from the workload as each query of the workload such that the first subset of statistics is not equivalent to the initial set of statistics with respect to that query.

52. The database system of claim 43, wherein the identifying means (b) comprises:
(i) means for identifying one or more subsets of the initial set of statistics, and
(ii) means for determining whether each subset of statistics identified by the identifying means (b)(i) is equivalent to the initial set of statistics with respect to each query.

53. The database system of claim 52, wherein the identifying means (b)(i) identifies subsets of the initial set of statistics in increasing order of update cost or size.

54. The database system of claim 52, wherein the identifying means (b)(i) identifies subsets of the initial set of statistics until an identified subset of the initial set of statistics is determined to be equivalent to the initial set of statistics with respect to each query.

55. The database system of claim 43, wherein the identifying means (b) comprises:
(i) means for identifying a seed subset of the initial set of statistics,
(ii) means for adding each of one or more subsets of the remaining subset of the initial set of statistics to the seed subset to produce one or more current subset of statistics, and
(iii) means for determining whether each current subset of statistics is equivalent to the initial set of statistics with respect to each query.

56. The database system of claim 55, wherein the identifying means (b)(i) comprises means for determining whether the initial set of statistics without any one statistic of the initial set of statistics is equivalent to the initial set of statistics with respect to each query, and, if not, including the one statistic in the seed subset.

57. The database system of claim 55, wherein the adding means (b)(ii) identifies subsets of the remaining subset of the initial set of statistics in increasing order of update cost or size.

58. The database system of claim 55, wherein the adding means (b)(ii) adds a subset of the remaining subset of the initial set of statistics to the seed subset to produce a current subset of statistics until a current subset of statistics is determined to be equivalent to the initial set of statistics with respect to each query.

59. The database system of claim 43, wherein the identifying means (b) comprises:
(i) means for partitioning statistics of the initial set of statistics into partitions such that each partition comprises statistics on a respective table of one of the one or more queries, and
(ii) means for identifying a subset of each partition such that the combined partition subsets are equivalent to the initial set of statistics with respect to the one query.

60. The database system of claim 59, wherein the identifying means (b)(ii) comprises means for identifying each partition subset such that an update cost or size for each partition subset is minimized.

61. The database system of claim 43, wherein the identifying means (b) comprises:
(i) means for identifying a seed subset of the initial set of statistics,
(ii) means for partitioning statistics of the remaining subset of the initial set of statistics into partitions such that each partition comprises statistics on a respective table of one of the one or more queries, and
(iii) means for identifying a subset of each partition such that the combined partition subsets and seed subset are equivalent to the initial set of statistics with respect to the one query.

62. The database system of claim 61, wherein the identifying means (b)(i) comprises means for determining whether the initial set of statistics without any one statistic of the initial set of statistics is equivalent to the initial set of statistics with respect to each query, and, if not, including the one statistic in the seed subset.

63. The database system of claim 61, wherein the identifying means (b)(iii) comprises means for identifying each partition subset such that an update cost or size for each partition subset is minimized.

* * * * *